United States Patent [19]

Doemen

[11] 4,449,081

[45] May 15, 1984

[54] COMPENSATING OUTPUTS OF HALL GENERATORS TO MINIMIZE EFFECTS OF TEMPERATURE VARIATION AND THE LIKE

[75] Inventor: Benno Doemen, St. Georgen, Fed. Rep. of Germany

[73] Assignee: Papst Motoren KG, St. Georgen, Fed. Rep. of Germany

[21] Appl. No.: 456,752

[22] Filed: Jan. 10, 1983

Related U.S. Application Data

[63] Continuation of Ser. No. 175,194, Jul. 31, 1980, abandoned.

[30] Foreign Application Priority Data

Aug. 4, 1979 [DE] Fed. Rep. of Germany ....... 2931686

[51] Int. Cl.³ .............................................. H02P 5/06
[52] U.S. Cl. .................................... 318/254; 318/317; 324/251; 324/117 H
[58] Field of Search ........... 324/251, 224, 225, 117 H; 307/491, 494, 310; 318/254, 254 A, 138, 439, 317

[56] References Cited

U.S. PATENT DOCUMENTS

| | | | |
|---|---|---|---|
| 3,521,159 | 7/1970 | Morrow | 324/224 |
| 3,597,679 | 8/1971 | Habfast | 324/251 |
| 3,622,898 | 11/1971 | Salmon | 324/251 X |
| 3,916,272 | 10/1975 | Grunleitner | 318/254 A X |
| 4,039,911 | 8/1977 | Tanikoshi | 318/254 A X |
| 4,119,895 | 10/1978 | Muller | 318/254 A X |
| 4,127,799 | 11/1978 | Nakamura et al. | 318/254 A X |
| 4,134,030 | 1/1979 | Pace | 307/309 |
| 4,199,696 | 4/1980 | Tanaka et al. | 327/117 H X |
| 4,207,533 | 6/1980 | Smith | 307/491 X |
| 4,266,189 | 5/1981 | Karlin et al. | 327/117 H |

Primary Examiner—G. Z. Rubinson
Assistant Examiner—Richard M. Moose
Attorney, Agent, or Firm—Michael J. Striker

[57] ABSTRACT

An improvement is disclosed in which a circuit utilizes the internal resistance or bulk resistance of a Hall generator in connection with an amplifier having a feedback resistance which is less or larger than the internal resistance or bulk resistance of the Hall generator. By utilizing this improvement, changes in output voltage of the Hall generator caused by variations in temperature and spread in characteristics can be at least partially compensated.

6 Claims, 3 Drawing Figures

COMPENSATING OUTPUTS OF HALL GENERATORS TO MINIMIZE EFFECTS OF TEMPERATURE VARIATION AND THE LIKE

This is a continuation of application Ser. No. 175,194, filed July 31, 1980, now abandoned.

BACKGROUND OF THE INVENTION

1. Field of the Invention

In its fullest application, this invention pertains to circuits which can be used with Hall generators in order to make their outputs at least partially independent of variations in temperature and of differences in serial spread of characteristics of individual Hall generators. However, in its most immediate sense, this invention pertains to devices which perform these functions within a commutatorless motor in which a Hall generator is used to regulate current in the stator coil or coils as a function of rotor position.

2. Description of the Prior Art

It is known that the ouput of a Hall generator can vary depending upon factors such as temperature and differences in serial spread of characteristics of individual Hall generators. Particularly in commutatorless motors in which Hall generators are conventionally used in order to sense the direction of the magnetic field to allow electronic commutation to take place, variation in output can cause excessively large currents to flow and can thereby either reduce the working efficiency of the motor or lead to a destruction of components therein.

It is known from U.S. Pat. No. 4,134,030 to equip a Hall generator with auxiliary circuitry in a single monolithic chip in order to prevent such voltage changes from taking place. In this reference, a differential amplifier and current mirror circuit are coupled to the Hall generator and vary the threshold voltage of the differential amplifier in accordance with the output voltage of the Hall generator irrespective of current changes in the Hall generator due to temperature variations. While this reference pertains to the similar problems as those with which the invention herein is concerned, the problems are solved not by provision of additional circuitry outside the Hall generator chip but rather within the chip itself. It is a similar problem whereby not only the threshold but also the entire analogous range is compensated.

However, Hall generators without the extra circuitry disclosed in this reference are currently available and in use, and it would be desirable to provide an improvement for use with a conventional Hall generator which would at least partially compensate for changes in its output voltage which result from the above-mentioned causes. Such an improvement would enable a user to purchase conventional Hall generators and utilize them in, e.g., a commutatorless motor.

SUMMARY OF THE INVENTION

This object, along with others which will appear hereinafter, is achieved by coupling intermediate elements between the Hall generator and the control circuitry which the Hall generator is required to drive. For example, in a commutatorless motor, these elements are located between the circuitry which energizes and de-energizes the stator coils and the Hall generator which senses the magnitude and the direction of the magnetic field within the motor. These elements are chosen in such a fashion that a feedback amplifier is created in which the feedback resistance is high as compared with the internal resistance or the bulk resistance of the Hall generator. As will be seen hereinafter, by so selecting these elements, the output of the electrical network which includes the Hall generator and the improvement disclosed herein becomes independent of the effect of the internal resistance or the bulk resistance of the Hall generator and therefore is at least partially compensated for output voltage changes resulting from changes in environment which are attributable to temperature-related or magnetic causes.

The invention herein can be used in association with each output terminal of a Hall generator. Thus, in the event that the Hall-effect voltage is developed across two independent output terminals, the improvement disclosed herein can be used in a parallel pair. In the event that the Hall generator has only one output terminal, it is only necessary to use one unit incorporating the invention. The invention is easily adapted to commutatorless motors of any type, and can be used to drive commutation control circuitry regardless of whether there is only one stator coil or a plurality of such stator coils. Additionally, the invention is so designed that any lack of compensation of the output voltage of the Hall generator may be partially corrected in subsequent portions of the control circuitry to which the invention is connected.

The novel teachings which are considered as characteristic for the invention are set forth in particular in the appended claims. The invention itself, however, both as to its construction and its method of operation, together with additional objects and advantages therefor, will be best understood from the following description of specific embodiments when read in connection with the accompanying drawings.

DETAILED DESCRIPTION OF PREFERRED EMBODIMENTS

Figure 1:
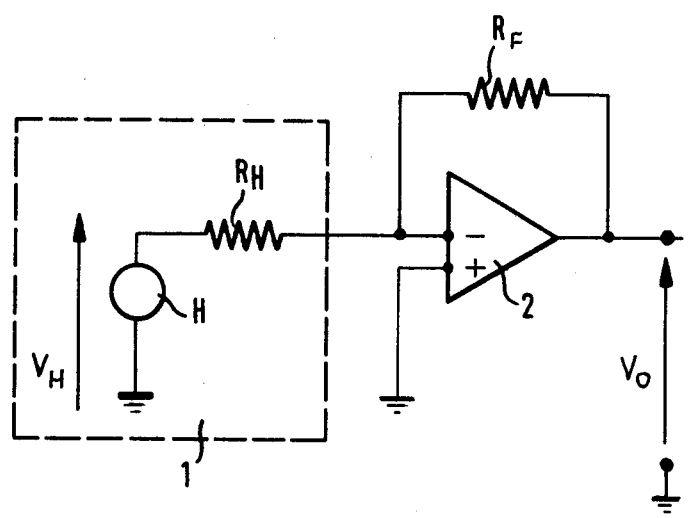
FIG. 1 is a schematic diagram showing the system which includes a Hall generator in addition to the invention disclosed herein for purposes of discussion of the mathematical principles by which this invention operates.

In FIG. 1, the Hall generator is shown within dashed lines in an idealized fashion. Hall generator 1 includes an ideal source H and a resistance $R_H$ placed in series therewith. The source H develops a Hall voltage $V_H$ in response to a magnetic field in which source H is placed. The output voltage of Hall generator 1 will appear between ground and that end of resistance $R_H$ which is unconnected to source H.

It is known to those skilled in the art that the voltage of Hall generator 1 will decrease with increasing temperature and will vary from one Hall generator to another. In order to at least partially compensate for such changes in the output voltage of Hall generator 1, the improvement shown schematically outside the dashed lines in FIG. 1 is provided, which improvement constitutes in a schematic fashion the invention described herein.

This improvement includes two separate elements: a stage 2, shown schematically as, and referred to immediately below as, an operational amplifier, an amplifier and a feedback network shown as, and referred to immediately below as, a resistance $R_F$. As is shown in FIG. 1, that end of resistance $R_H$ which is unconnected to source H is connected to the inverting input of operational amplifier 2, while resistance $R_F$ bridges across the inverting input of operational amplifier 2 and the output thereof. The non-inverting input of operational amplifier 2 is grounded. The voltage $V_O$ shown in FIG. 1 is the voltage between the output of operational amplifier 2 and ground.

It is known to those skilled in the art that the voltage $V_O$ delivered by operational amplifier 2 will be equal to the overall gain G of operational amplifier multiplied by Hall voltage $V_H$.

Hence, $$V_0 = G \cdot V_H$$

This gain, as is known to those skilled in the art, is governed by the equation $$G = \frac{R_F + R_H}{R_H}$$

By choosing $R_F \gg R_H$, $$G = \frac{R_F}{R_H}$$

It is known that Hall voltage $V_H$ decreases with temperature according to the equation $$V_H = V_{NOM} \cdot K_T$$

so that, for purposes of analysis, Hall generator 1 can be viewed as having a resistance $$R_H = R_{NOM} \cdot K_T,$$

where $V_{NOM}$ is the nominal Hall voltage at some reference temperature, $R_{NOM}$ is the corresponding resistance, and $K_T$ is the temperature coefficient, which in commercial Hall-generators is negative.

Retaining the assumption of $R_F \gg R_H$, and substituting into the equation first listed above yields $$V_0 = \left( \frac{R_F}{R_{NOM} \cdot K_T} \right) V_{NOM} \cdot K_T$$

so that output voltage $V_O$ is independent of $K_T$ $$V_0 = \left( \frac{R_F}{R_{NOM}} \right) V_{NOM}$$

Thus, it can be seen that output voltage from operational amplifier 2, namely $V_O$, will remain completely independent of temperature and thus compensated for temperature variation as long as $K_T$ remains constant for the temperatures in question. As a practical matter, this is the case.

It will be noted that the stage shown as operational amplifier 2 need not necessarily be an operational amplifier. A single-stage transistor amplifier may be used, provided that the above-referenced relationship between resistances $R_H$ and $R_F$ will hold true. Likewise, resistance $R_F$ may be a network of resistors or may be one resistor alone.

It may thus be seen by those skilled in the art that by choosing a resistance $R_F$ which is less or larger than resistance $R_H$, that compensation for changes in output voltage from Hall generator 1 may be achieved in the operating environment in question. Moreover, a certain serial spread in the Hall voltages outputed by the Hall generators of the same type is usually encountered because Hall generators supplying a relatively low Hall voltage usually have a relatively low bulk resistance. Such a serial spread in characteristics of individual Hall generators is substantially compensated for by the present invention. Thus, environmental stability of the system which contains Hall generator 1 and the invention herein is high.

For the compensation it is important that an effective feedback from the output to the non-inverting input of the operational amplifier be established.

Figure 2:
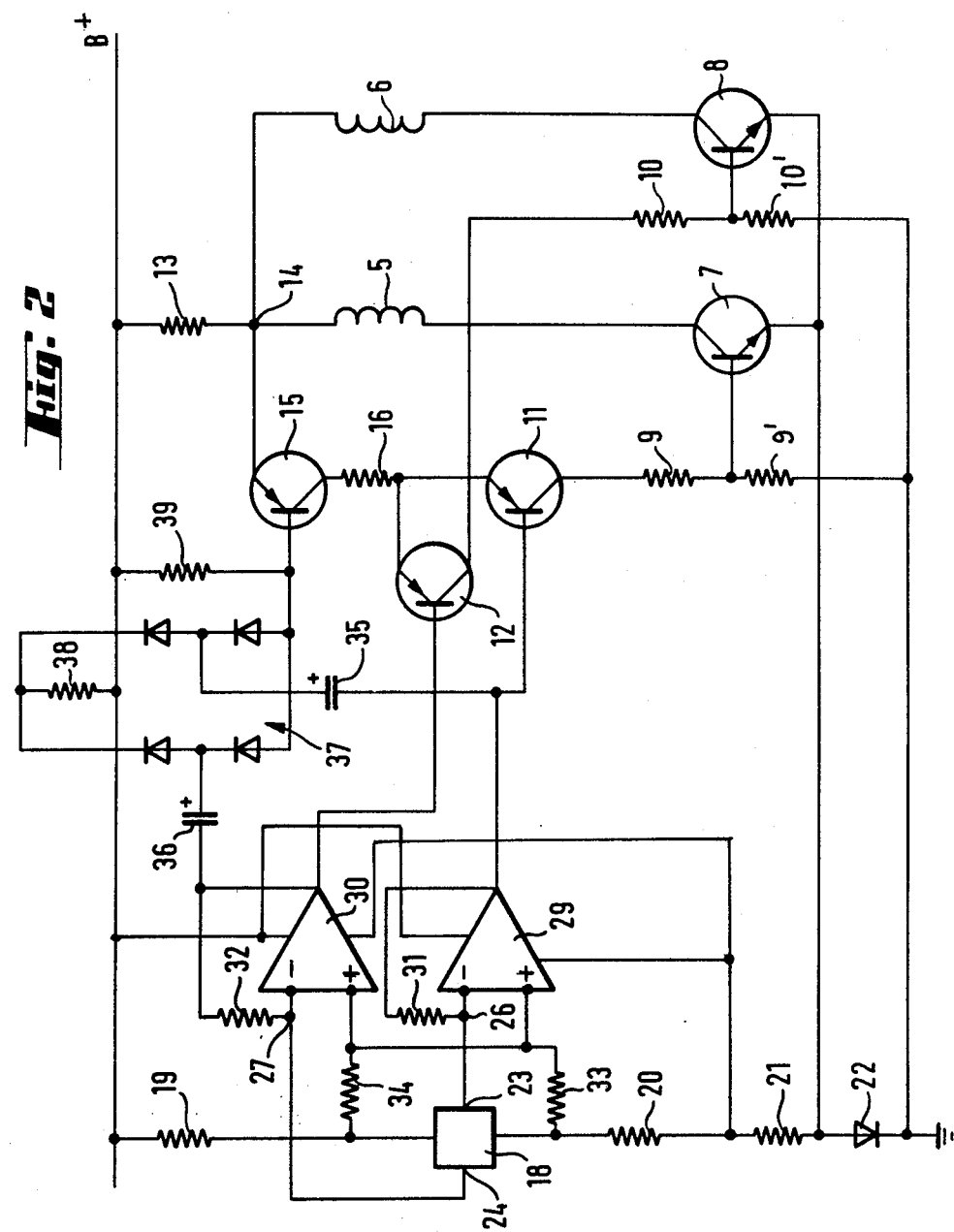
FIG. 2 is a schematic diagram showing a commutatorless motor in which a first embodiment of this invention is installed.

Turning now to FIG. 2, it can be seen that a Hall generator 18 is located within a commutatorless motor which has a permanent-magnet rotor (not shown). One side of Hall generator 18 is connected to the hot side B+ of a DC power supply via resistor 19. Resistor 20 is connected at one end to Hall generator 18, and is connected at its other end to one end of resistor 21. That end of resistor 21 which is unconnected to resistor 20 is connected to the anode of diode 22, and the cathode of diode 22 is grounded. Therefore, a series network is formed which includes resistor 19, Hall generator 18, resistor 20, resistor 21 and diode 22, and Hall generator 18 is thus connected to power.

As the magnetic field, applied to Hall generator 18 changes as a function of the rotational position of the rotor of the motor, the potential difference between output terminals 23 and 24 of Hall generator 18 will change. Thus, as voltage at output terminal 23 rises, voltage at output terminal 24 falls, and vice versa. Output 23 is connected to the inverting input of operational amplifier 29, while output terminal 24 is connected to the inverting input of operational amplifier 30. Operational amplifiers 29 and 30 together define a differential amplifier and are supplied with power by connection between the hot side of the DC power supply and the common junction point between resistors 20 and 21. A voltage divider formed by resistors 33 and 34 which are connected in series with each other across Hall generator 18 (and are therefore connected between resistor 19 and resistor 20) is connected at its midpoint to the non-inverting inputs of both operational amplifiers 29 and 30. Moreover, feedback resistor 31 bridges across the inverting input and the output of operational amplifier 29, while feedback resistor 32 bridges across the inverting input and the output of operational amplifier 30.

Feedback resistors 31 and 32 are so chosen that they are much larger than the internal resistance or bulk resistance of Hall generator 18. As a result, voltages appearing at the outputs of operational amplifiers 29 and 30 will be at least partly compensated for changes in the temperature to which Hall generator 18 is subjected.

In the circuit shown in FIG. 2, the motor utilizes two independent coils 5 and 6 to provide the stator field. Each of coils 5 and 6 carries current only in one direction. Therefore, in order to allow the rotor to rotate, coils 5 and 6 must be energized alternately in order to provide an alternating magnetic field.

In order to accomplish this latter objective, coil 5 is connected at one end to the collector of transistor 7, while coil 6 is connected at one end to the collector of transistor 8. The other ends of coils 5 and 6 are connected to the hot side of the DC power supply via resistor 13. Thus, when transistor 7 is turned on and off, coil 5 is energized and de-energized, while when transistor 8 is turned on and off, coil 6 will be energized and de-energized. The emitters of transistors 7 and 8 are both connected to the common junction point between resistor 21 and the anode of diode 22. Thus, by applying voltages to the bases of transistors 7 and 8, these transistors can be turned on, while removal of voltages at the bases of transistors 7 and 8 will turn these transistors off.

In order to turn transistors 7 and 8 on and off, these transistors are connected, respectively, to driver transistors 11 and 12, which themselves are connected, respectively, to the outputs of operational amplifers 29 and 30. The output of operational amplifier 29 is connected to the base of driver transistor 11, while the output of operational amplifier 30 is connected to the base of driver transistor 12. The collector of driver transistor 11 is connected to the base of transistor 7 through resistor 9, while the collector of driver transistor 12 is connected to the base of transistor 8 by resistor 10. The bases of transistors 7 and 8 are, respectively, biased off ground through resistors 9' and 10'. The emitters of driver transistors 11 and 12 are connected together at one end of resistor 16. The other end of resistor 16 is connected to the collector of transistor 15. The emitter of transistor 15 is connected to the common junction point between resistor 13 and coils 5 and 6.

The operation of transistor 15 will be described below, but it suffices here to state that transistor 15 serves as a current regulator which regulates the current flowing through coils 5 and 6 in accordance with the magnetic field existing within the collectorless motor. Assuming for the moment that transistor 15 is turned on so that power is available to turn driver transistors 11 and 12 on and off, it can be seen that coils 5 and 6 will be energized and de-energized in accordance with voltages appearing at output terminals 23 and 24.

If, for example, the voltage at output terminal 23 rises, the voltage at output terminal 24 falls. Therefore, the output of operational amplifier 29 will decrease in voltage, while the output of operational amplifier 30 will increase in voltage.

Both driver transistors 11 and 12 are PNP transistors. Thus, as the voltage at the output of operational amplifier 29 falls, more and more current can flow from the emitter of driver transistor 11 to the base thereof. Conversely, as the voltage at the output of operational amplifier 30 rises, less and less current can flow from the emitter of driver transistor 12 to the base thereof. Thus, driver transistor 11 turns on, while driver transistor 12 turns off.

As driver transistor 11 turns on, more current is caused to flow through resistors 9 and 9', causing the voltage therebetween, which voltage is applied to the base of transistor 7, to increase. Since transistor 7 is an NPN transistor, transistor 7 thus gradually turns on and allows more and more current to flow through coil 5. In a similar fashion, current through resistors 10 and 10' is reduced, causing NPN transistor 8 to become less conductive and to draw less and less current through coil 6.

It will be apparent to those skilled in the art that in the event that the voltage at output terminal 24 increases, the voltage at output terminal 23 will decrease, causing exactly the opposite effects from those described above. Thus, it can be seen that coils 5 and 6 are energized and de-energized respectively by operational amplifiers 29 and 30, which in turn are operated in accordance with voltages appearing at output terminals 23 and 24.

However, it is known to those skilled in the art that coils 5 and 6 can never be simultaneously energized if the commutatorless motor is to operate efficiently. Moreover, those skilled in the art will also apprehend that it is desirable to reduce the current passing through either one of coils 5 and 6 adjacent the point of commutation, i.e., about the point at which current through one of coils 5 and 6 is shut off while current through the other is about to be turned on. In order to accomplish these two objectives, current through transistor 15 is regulated in accordance with the strength of the magnetic field sensed by Hall generator 18. In order to accomplish this last objective, voltages appearing at the outputs of operational amplifiers 29 and 30 are utilized to regulate transistor 15.

The output of operational amplifier 29 is connected to a conventionally-connected full-wave bridge 37 which contains four diodes, via capacitor 35. The output of operational amplifier 30 is similarly connected to bridge 37, across a diagonal thereof, via capacitor 36. The cathodes of two of the diodes are connected to the hot side of the DC power supply via resistor 38, while the anodes of the other two diodes are connected to the hot side of the DC power supply via resistor 39. Hence, one corner of bridge 37 is connected to capacitor 35, the corner opposite thereto is connected to capacitor 36, and the other two corners of bridge 37 are connected to the hot side of the power supply via resistors 38 and 39, respectively. That corner of bridge 37 which is connected to resistor 39 is also connected to the base of PNP transistor 15.

As the alternating magnetic field rises and falls while the rotor rotates, AC voltages appearing at the outputs of operational amplifiers 29 and 30 are passed through capacitors 35 and 36 and rectified in bridge 37. As magnetic field intensity increases, more and more current is drawn from the emitter of transistor 15 to the base of transistor 15. Therefore, current available to turn driver transistors 11 and 12 on and thereby cause current to flow through coils 5 and 6 is increased. In exactly the same fashion, a decrease in magnetic field strength causes a decrease in current flowing through coils 5 and 6. Hence, as the alternating magnetic field approaches the zero-crossover point, current through whichever one of coils 5 and 6 is conducting current decreases. This decrease minimizes conversion of reverse EMF caused by the conversion of energy stored in either coil 5 or coil 6 into electrical energy and thereby minimizes the chance that transistor 7 or transistor 8 or both will be burned out by reverse biasing. Moreover, transistor 15 is non-linear—a voltage drop exceeding some predetermined threshold value determined by the type of semiconductor material utilized (i.e., germanium or silicon) must exist between the base and the emitter of transistor 15 in order to cause transistor 15 to be turned on. Thus, the non-linearity of transistor 15 which exists at low voltages across its emitter-base path (which in turn are caused by weak emitter fields) actually serves to cut off current to coils 5 and 6 for a period which extends both previous to and subsequent to the zero-crossover point of the alternating magnetic field. Therefore, coils 5 and 6 are alternately energized—current through one increases, subsequently decreases, and subsequently ceases, in order to allow current to flow through the other one to increase, decrease, and cease in the same fashion.

Hence, it may be seen that transistor 15 serves the function of a non-linear comparator. Transistor 15 compares the voltage developed across resistor 13 with the voltage developed across bridge 37 in order to regulate current through coils 5 and 6 in accordance with magnetic field strength while cutting such current completely off in the presence of weak magnetic fields. The embodiment shown in FIG. 2 can extend the operating temperature range from its normal range, namely −40° C. to +65° C., to the wider range of −40° C. to +100° C. Moreover, because the characteristics of transistor 15 are temperature sensitive, residual temperature dependency of outputs of Hall generator 18 can be further reduced.

Capacitors 35 and 36 serve the purpose of protecting the rest of the remaining circuitry in the event that the rotor, by virtue of load, cannot rotate or is forced to rotate at a substantially reduced speed. As speed of rotation decreases, the frequency of the AC voltages at the outputs of operational amplifiers 29 and 30 decreases. Therefore, current to coils 5 and 6 is reduced, since capacitors 35 and 36 have greater impedance at lower frequencies. In the event that the rotor is completely prevented from rotating, capacitors 35 and 36 charge up and current to coils 5 and 6 is shut off completely. Therefore, overheating of the motor and possible burnout of the remaining components is avoided. Diode 22 is likewise a protective element—it protects transistors 7 and 8 from burning out under the influence of reverse EMF.

Figure 3:
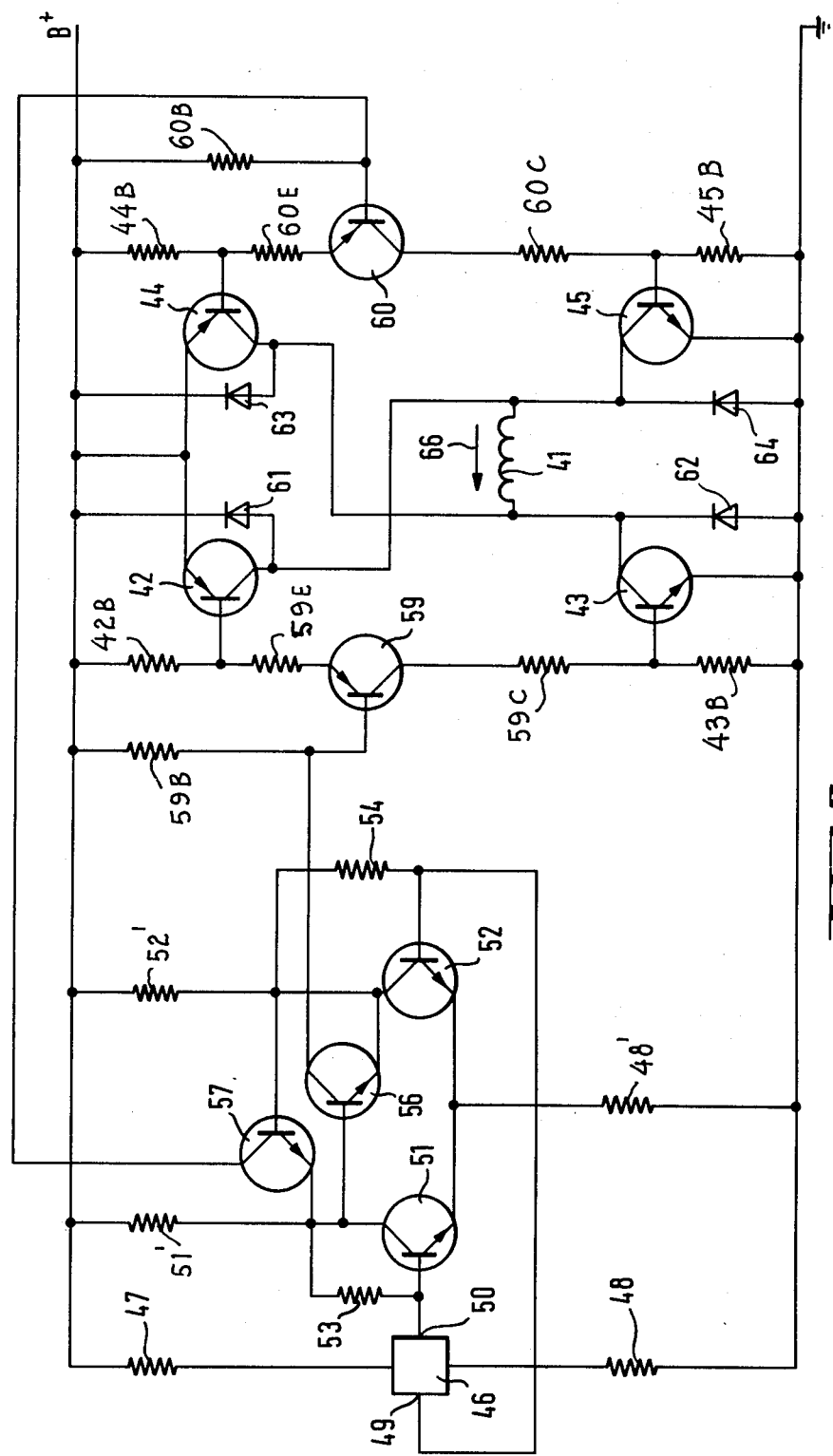
FIG. 3 is a schematic diagram of a commutatorless motor in which a second embodiment of this invention is installed.

The schematic diagram shown in FIG. 3 pertains to a commutatorless motor which utilizes only one coil 41. Coil 41 is alternately energized in opposite directions, in contrast to the single directions of energization of coils 5 and 6 in FIG. 2. As will be seen hereinafter, coil 41 will be energized according to the strength and direction of the magnetic field sensed by Hall generator 46.

Hall generator 46 is connected to the hot side of a DC power supply via resistor 47, and is connected to ground via resistor 48. Output terminals 49 and 50 of Hall generator 46, as before, will carry inversely varying voltages depending upon the strength and direction of the magnetic field within the motor as the permanent-magnet (not shown) rotates.

Output terminal 49 is connected to the base of NPN transistor 52, while output terminal 50 is connected to the base of NPN transistor 51. Transistors 51 and 52 together form a difference amplifier. The collector of transistor 51 is connected to the hot side of the DC power supply via resistor 51', while the collector of transistor 52 is similarly connected, via resistor 52'. The emitters of transistors 51 and 52 are connected together, and are biased off ground via resistor 48'. Moreover, the collector and base of transistor 51 are connected together via feedback resistor 53, while corresponding components of transistor 52 are similarly connected via feedback resistor 54. As was previously described, feedback resistors 53 and 54 are so chosen that they are much greater than the internal resistance or bulk resistance of Hall generator 46.

NPN transistor 56 has its base connected to the collector of transistor 51, while the emitter of transistor 56 is connected to the collector of transistor 52. In the same fashion, the emitter of NPN transistor 57 is connected to the collector of transistor 51, while the base of transistor 57 is connected to the collector of transistor 52. Transistors 56 and 57 serve biasing purposes for determining a minimum threshold voltage in a fashion similar to the function of transistor 15 in the embodiment shown in FIG. 2, in order to provide the necessary gaps between alternate current flows through coil 41. For example, in the event that voltage at output terminal 50 rises while voltage at output terminal 49 falls, transistor 51 will begin to conduct current while transistor 52 will be cut off. After transistor 51 has conducted enough current in order to cause the base emitter standoff voltage of transistor 56 to be exceeded, current will flow in transistor 56 and, as will be seen hereinafter, current will flow in one direction through coil 41. As the voltage at output terminal 50 begins to decrease while the voltage at output terminal 48 increases, transistor 56 and then transistor 51 will be shut off. In an analagous fashion, transistor 52 will begin to conduct current and will, after a sufficiently intense magentic field strength has developed, cause transistor 57 to conduct current, thus causing current to flow through coil 41 in the opposite direction. Transistors 56 and 57 thus ensure that at week magnetic field strengths, no current will flow through coil 41. Thus, transistors 56 and 57 together are non-linear in the same fashion as, and for the same reason as, transistor 15 was non-linear. The base of transistor 59 is connected to the collector of transistor 56, while the base of transistor 60 is connected to the collector of transistor 57. Moreover, the base of transistor 59 is connected to the hot side of the DC power supply via resistor 59B, while the same holds true for the base of transistor 60 and resistor 60B.

The emitter of transistor 59 is connected to resistor 59E, while the emitter of transistor 60 is connected to resistor 60E. Remote ends of transistors 59E and 60E are connected, respectively, to resistors 42B and 44B, which latter resistors are both connected to the hot side of the DC power supply. The base of transistor 42 is connected to the common junction points between resistors 59E and 42B, while the base of transistor 44 is connected to the common junction point between resistor 60E and 44B. The emitters of transistors 42 and 44 are connected together to the hot side of the DC power supply. Diodes 61 and 63 are connected, respectively, between the collectors of transistors 42 and 44 and the hot side of the DC power supply, with the anodes of the diodes in question being connected to the transistors in question.

The collector of transistor 59 is connected to resistor 59C. Similarly, the collector of transistor 60 is connected to resistor 60C. The remote ends of resistors 59C and 60C are, respectively, connected to resistors 43B and 45B, which latter resistors are connected to ground. The collector of transistor 43 is connected to the collector of transistor 44, while the collector of transistor 45 is connected to the collector of transistor 42. The base of transistor 43 is connected to the common junction point between resistors 59C and 43B, while the base of transistor 45 is similarly connected to the common junction point between resistors 60C and 45B. The emitters of transistors 43 and 45 are grounded, as are the anodes of diodes 62 and 64, which diodes bridge between ground and the collectors of transistors 43 and 45 respectively. Finally, coil 41 is connected between the collectors of transistors 42 and 44, and is thus connected between the collectors of transistors 43 and 45.

If transistor 59 is turned on, current will flow from its emitter to its collector. This will cause the potential at the base of transistor 42 to drop, causing transistor 42 to conduct current. As transistor 42 turns on, transistor 43 will also turn on since the potential at its base will increase. Thus, a current path is formed which extends from the collector of transistor 42, through coil 41 in the direction shown by arrow 66, and into the collector of transistor 43, going thence to ground through the emitter of transistor 43. Hence, when transistor 59 is turned on, current will flow through coil 41 in the direction shown by arrow 66. The other half of the circuitry shown in the right-hand portion of FIG. 3 works in an exactly analagous fashion: when transistor 60 is turned on, transistors 44 and 45 are also turned on so that current flows through the collector of transistor 44, through coil 41 opposite in direction to arrow 66, and into the collector of transistor 45, from which transistor the current flows to ground. Thus, by alternately energizing and deenergizing transistors 59 and 60, current through coil 41 can be reversed about commutation points. Moreover, as will be obvious to those skilled in the art, the magnitude of current flowing through coil 41 can be regulated by varying the degrees of conduction of transistors 59 and 60.

Hence, it can be seen that the schematic diagram shown in FIG. 3 serves to regulate current flowing through coil 41 in accordance with the magnitude and direction of the magnetic field existing inside the commutatorless motor. Adjacent zero-crossover points of the magnetic field, current through coil 41 is completely cut off, since the voltage across the base-emitter junctions of transistors 56 and 57 will not be exceeded, so that these transistors will be turned off. However, after this voltage is exceeded, either transistor 59 or transistor 60 will be turned on and will be caused to conduct an increasing amount of current until a maximum amount of current flows through coil 41. Subsequently, the amount of current flowing through coil 41 will decrease, to be subsequently cut off and readied for subsequent conduction in the opposite direction to begin another half-cycle. Diodes 61, 62, 63, and 64 serve, as did diode 22 in the embodiment shown in FIG. 2, to protect transistors 42, 43, 44, and 45 from burning out as a result of reverse EMF.

It will be understood that each of the elements described above, or two or more together, may also find a useful application in other types of constructions differing from the types described above.

While the invention has been illustrated and described as embodied in an improvement for compensating outputs of Hall generators to minimize effects of temperature variation and the like, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an electronic power supply for a commutatorless DC motor which includes a permanently magnetized rotor for generating a magnetic field, a stator winding arrangement comprising at least one stator coil positioned in torque-producing arrangement consisting of a single stationary Hall generator disposed in magnetic field sensing relation to said rotor so as to develop first and second voltage output signals at first and second output terminals thereof, and control circuitry connected to said output terminals for energizing and deenergizing said at least one stator coil in response to rotor position, the improvement comprising first and second amplifier stages each having an input and an output, the first stage having its input connected to the first output terminal and the second stage having its input connected to the second output terminal, the outputs of said first and second stages being connected to the control circuitry, first and second feedback networks connected between the input and the output of the first and of the second stage, respectively, and said control circuitry including non-linear control means responsive to output signals from said first and second stages for preventing current flow through said stator coil when the magnetic field is below a predetermined threshold value and for passing current through said stator coil when the magnetic field exceeds said value.

2. The improvement defined by claim 1, wherein each of said feedback networks comprises a feedback resistance which is high as compared with the internal resistance, to accomplish in addition to the compensation also an amplification of the output signal of said Hall generator.

3. A brushless DC motor arrangement comprising a permanent magnetic rotor for generating a magnetic field, a stator winding arrangement comprising at least one stator coil positioned in torque-producing relation to said rotor, a rotor position sensing arrangement consisting of a stationary Hall generator defining an internal resistance between first and second output terminals thereof and disposed in magnetic field sensing relation to said rotor so as to develops first and second magnetic field responsive output signals at said first and second output terminals, first and second amplifier stages each having an input and an output, the first stage having its input connected to the first output terminal and the second stage having its input connected to the second output terminal, and control circuitry linked to the outputs of said first and second amplifier stages for energizing and deenergizing said at least one stator coil in response to the position of the rotor, said control circuitry comprising converter means having first and second inputs connected to the output terminals of said first and second amplifier stages for converting the output signals of said first and second amplifier stages into a magnetic field strength signal having an amplitude propertional to the magnitude of the strength of said magnetic field, current sensing means for generating a coil current signal substantially proportional to the current flowing through said at least one stator coil, and current control means responsive to said magnetic field strength signal and to said coil current signal for controlling the current through said stator coil so as to be substantially proportional to the sensed magnitude of the magnetic field strength.

4. The arrangement as defined in claim 3, wherein said control circuitry comprises a first capacitor connected between the output of said first amplifier stage and said first input of said converter means and a second capacitor connected between the output of said second amplifier stage and said second input of said converter means for passing the output signals of said first and second amplifier stages to said converter means when said rotor rotates, and for blocking the passage of the output signals of said first and second amplifier stages to said converter means and causing said current control means to shut off the flow of current through said stator coil when said rotor is prevented from rotating.

5. A brushless DC motor arrangement comprising a permanent magnetic rotor for generating a magnetic field, a stator winding arrangement comprising at least one stator coil positioned in torque-producing relation to said rotor, a rotor position sensing arrangement consisting of a single stationary Hall generator defining an internal resistance between first and second output terminals thereof and disposed in magnetic field sensing relation to said rotor so as to develop first and second magnetic field responsive output signals at said first and second output terminals, first and second amplifier stages each having an input and an output, the first stage having its input connected to the first output terminal and the second stage having its input connected to the second output terminal, first and second feedback networks connected between the input and the output of the first and second amplifier stage, respectively, for compensating variations of said internal resistance, control circuitry linked to the outputs of said first and second amplifier stages for energizing and deenergizing said at least one stator coil in response to the position of the rotor, and said control circuitry including non-linear control means responsive to output signals from said first and second stages for preventing current flow through said stator coil when the magnetic field is below a predetermined threshold value and for passing current through said stator coil when the magnetic field exceeds said value.

6. The arrangement as defined in claim 5, wherein said non-linear control means comprises at least one non-linear amplifier stage.

* * * * *